United States Patent [19]

Shanks et al.

[11] 4,032,915
[45] June 28, 1977

[54] SPEED-TOLERANT DIGITAL DECODING SYSTEM

[75] Inventors: John L. Shanks; Randol R. Read, both of Tulsa; John W. Supernaw, Broken Arrow, all of Okla.

[73] Assignee: Standard Oil Company (Indiana), Chicago, Ill.

[22] Filed: July 23, 1975

[21] Appl. No.: 598,314

[52] U.S. Cl. .......................... 340/347 DD; 360/44
[51] Int. Cl.² ......................................... H04L 3/00
[58] Field of Search ............... 340/347 DD; 360/39, 360/44; 178/69.5 R, 66, 67, 68

[56] References Cited

UNITED STATES PATENTS

| | | | |
|---|---|---|---|
| 2,870,429 | 1/1959 | Hales | 340/347 DD |
| 3,416,133 | 12/1968 | Hunkins | 340/347 DD |
| 3,508,228 | 4/1970 | Bishop | 360/44 |
| 3,720,927 | 3/1973 | Wolf | 360/44 |
| 3,760,412 | 9/1973 | Barnes | 340/347 DD |
| 3,823,397 | 7/1974 | Howard | 340/347 DD |
| 3,887,769 | 6/1975 | Cichetti | 178/69.5 R |

*Primary Examiner*—Charles D. Miller
*Attorney, Agent, or Firm*—Albert C. Metrailer; Arthur McIlroy

[57] ABSTRACT

This disclosure describes a decoding system for decoding and formatting digital data recorded on magnetic tape in the STR ("speed-tolerant recording") format. The digital words are stored in cells of about equal width except that the leading cell of each word, called a "sync" cell, is of double width. Each cell starts with a positive pulse, and a cell detector provides a signal each time this occurs. The apparatus includes a data detector, which analyzes the width of this positive pulse relative to the cell width to determine whether the cell is a 1 bit or a 0 bit. Since the measurement is relative, cell length, i.e., total cell time, is not important. The bit determination is loaded into a shift register. Other apparatus determines the width of the cell, so that a sync cell detector can determine whether a sync cell is present or not. When a sync cell is detected, a pulse is generated which actuates the output buffer register to load the bits from the shift register. Data flows from buffer to a computer.

1 Claim, 3 Drawing Figures

SPEED-TOLERANT DIGITAL DECODING SYSTEM

FIELD OF THE INVENTION

This invention lies in the field of digital data encoding and decoding apparatus. More specifically, it concerns apparatus for decoding the digital signals recorded on magnetic tape in the STR format.

In magnetic recording, particularly in small, portable, digital, magnetic cassette recorders, such as used for seismic recording, and the like, the motor drive may vary in speed. It is important in reading the recorded tape that the data can be properly decoded, irrespective of variations in the speed of the motor.

In the prior art, a recording system, using what is called the STR format, employs a type of pulse width modulation, which is tolerant to variations in speed of a recording medium. The best reference we have seen on this is the anonymous communication on page 32 of the January 1973 issue of Computer Design. This apparatus has been designed to decode data recorded in that format. More particularly, it is designed to decode magnetic tape records from a portable, seismic field recorder in which the data are recorded, for example, on one-quarter inch-wide magnetic tape.

In the recording process, the digital words consist of a selected number of bits, such as 18, for example, and each work is identified by means of a sync bit, which is a two cells-width, instead of the single-cell width for each of the other bits of the word. Consequently, the decoding apparatus must recognize not only the coding system in which the data have originally been recorded, but also must recognize the presence of the sync bits, so that the output of the decoder will automatically provide works which start with the sync bit and continue through the selected number of bits, essentially independent of tape speed.

Each of the digital devices discussed is well known to users of such devices. For example, AND gates, such as units 22 and 24 are listed on pp. 2–34 of the I.C. Update Master Catalog (1975), issued by I.C. Update Master, 645 Stewart Ave., Garden City, NY 11530. For example, one may use Texas Instruments Unit SN7408 for this gate. Counter 28 may be of the types listed on pp. 2-28, e.g., Motorola Unit MC54193. Shift registers 16 are given on pp. 2–42, e.g., Signetics Unit N74164. Buffer Register 18 is made up of three hex D-Type Edge-Triggered Flip-Flop Texas Instruments type SN74174 (pp. 2–34), and 5 Texas Instruments type SN7438 Quad 2-input NAND Buffer, open collecter (pp. 2–36). Cell detector 40 may be a Texas Instruments type SN74123, a Dual Retriggerable Monostable Multivibrator with Clear (see pp. 2–41). Clock 20 is so conventional (a simple multivibrator oscillator) that no further description is deemed necessary. Counter unit 56 and counter unit 70 may be of the types listed on pp. 2–28, for example, type Motorola MC74193. Adder 66 is of a type found on pp. 2–25, for example, 2 type Motorola MC7483 in Cascade.

SUMMARY OF THE INVENTION

It is a primary object of this invention to provide a simple, all digital apparatus for decoding seismic digital magnetic tape recordings which are in the STR format, and which have sync bits to separate each of the serial words on the tape.

These and other objects are realized and the limitations of the prior art are overcome in this invention by providing an apparatus which includes several components.

One of the components is a cell detector, to determine the instant of start of each bit cell. This cell detector is sensitive to each positive rise from zero on the tape. The cell detector output pulse is a very short time pulse, which rises with the beginning of each cell, or cell edge, and on its downsweep the cell detector signal causes the counters to be reset, shift registers to shift, etc.

Another component is a data detector, into which the signals from the magnetic tape head, reading data from the tape, are also entered. These signals include the beginning portions of each cell, where the signal is a logical 1, and the ending portions of each cell where the signal is a logical 0. The ratio of the time duration of the logical 1 part to the logical 0 part determines whether the cell bit is a 1 or a 0. These portions of the cells gate an oscillator into an up-down counter, the logical 1 gating the upcount, and the logical 0 gating the downcount, so that the resultant count of the counter at the end of the cell will be plus or minus, depending upon the relative lengths of time that the signal is a 0 or a 1. This positive or negative sign is a determination of the bit value, and is loaded into a shift register on signal from the cell detector. On each cell edge (the sharp rise of voltage at the start of each cell), the cell detector starts the counter. The sign of the output of the counter at the next cell edge is loaded into the shift register as a 0 or a 1.

A second function of the apparatus is to identify the sync cells by determining the cell width, that is, the same (or space on the tape) between call edges. This is done by counting an oscillator, or clock, in an upcounter, called a cell-width counter. This counter puts the output of the counter, in the form of a multiple-bit word, into an adder, and also puts the same multiple-bit word, shifted by one bit, into the second input of the adder. Thus, the output of the adder shows a mutliple-bit word of value equal to 1.5 times the value of the bit-word output of the cell-width counter.

The sync detector is a downcounter, which at each cell edge is preset to the output of the adder, and counts down at the same clock rate of the cell-width counter. This counts down from the preset value of the adder output at the end of the previous cell. For normal-width data cells, the counter never reaches zero. The sync detector counter will count down to zero at a time which is about 1½ normal cell widths, that is, a point about three-fourth of the sync cell width. When the count reaches zero, the counter puts out a pulse which is equivalent to the statement "This is a sync cell." This pulse signals the buffer register to load the bits from the shift register, and at the same time starts the loading of a new word into the shift register. Just before the unloading, the buffer register had a full word which was begun on the previous sync cell and therefore has the proper number of bits. On command from the computer, the buffer register shifts out the word into the computer storage.

BRIEF DESCRIPTION OF THE DRAWINGS

These and other objects and advantages of this invention and a better understanding of the principles and details of the invention will be evident from the following description, taken in conjunction with the appended drawings, in which.

DESCRIPTION OF THE PREFERRED EMBODIMENTS

Figure 1:
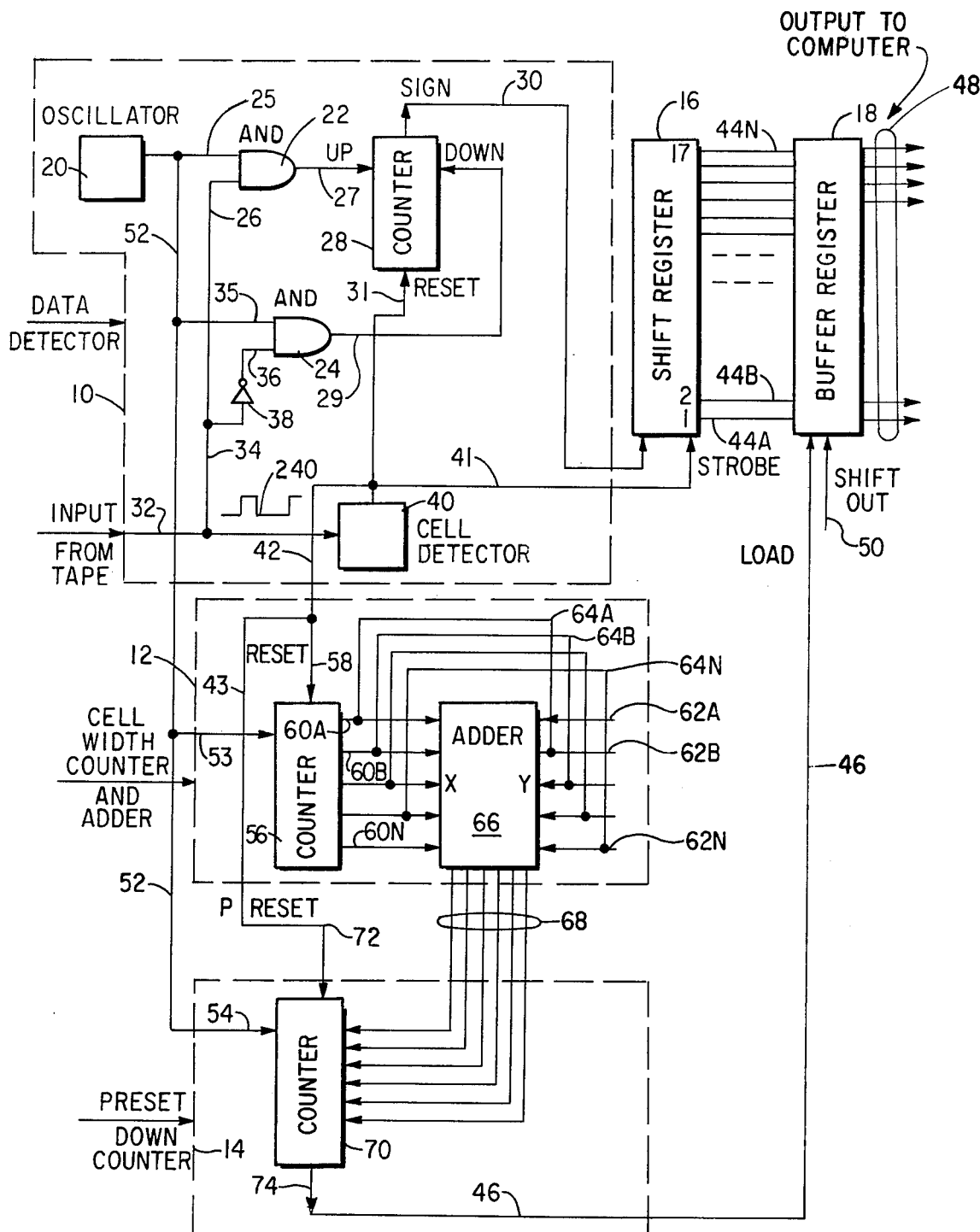
FIG. 1 shows in schematic form the wiring connections of the apparatus of this invention.

Referring now to the drawings, FIG. 1 shows in schematic form the electronic circuitry of the apparatus of this invention. There are three principal parts outlined in separate dashed lines. Numeral 10 indicates generally the data-detector portion of the apparatus. Numeral 12 indicates generally the cell-width counter and adder portion of the apparatus. Numeral 14 indicates the preset downcounter, which is the preset sync detector of the apparatus.

Figure 2:
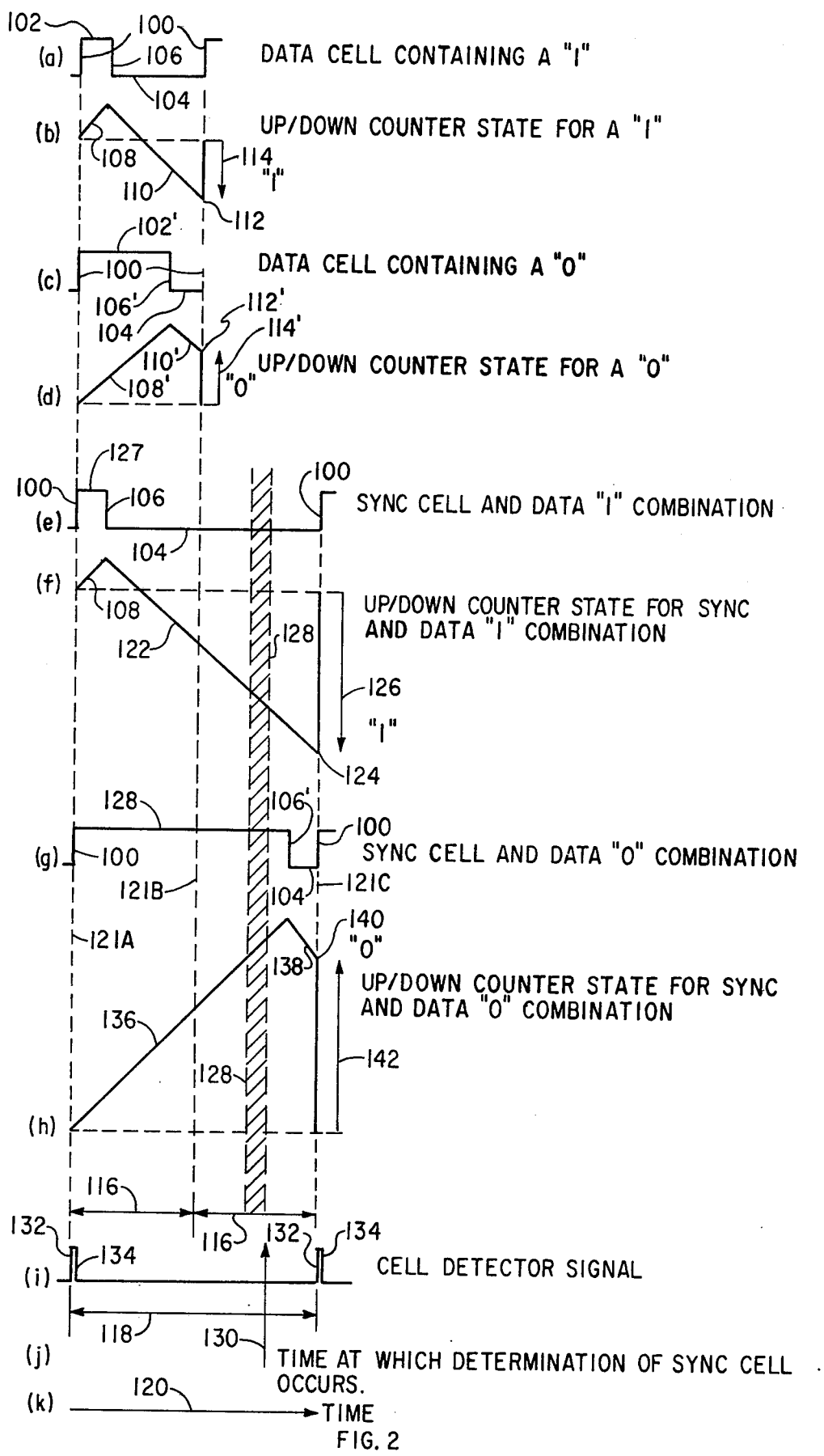
FIG. 2 represents the wave shapes detected at various portions of the apparatus in accordance with the operation of the circuit of FIG. 1.

In order to understand the operation of the circuitry, it is well to first discuss the recording system and the type of recording format so that the operation of the various parts of the apparatus will be more easily understood. Referring now to FIG. 2, there is shown a number of lines on which various wave shapes are indicated. The line (a) indicates the data cell for a logical 1. The logical 1 in the data cell starts at the beginning of the cell (cell edge) with a rapid rinse in amplitude. this is indicated by numeral 100. Then it stays about constant, indicated by numeral 102 for a time which is approximately one-fourth to one-third of the single cell width, after which it drops back to 0, as shown by vertical line 106 and then remains 0, as shown by line 104, until the end of the cell (or the next cell edge), when it rises again. Line (c) shows a data cell containing a logical 0. Each data cell starts with a positive rise in amplitude. (This is called the cell edge and is what is detected by the cell detector.) On line (c), the cell edge 100 rises to a level of 1, and then, as shown by line 102', lasts for a width of approximately two-third to three-fourth of the duration of the cell. It then drops back to 0, as shown by 106' and remains 0 (line 104) until the end of the cell, and the next cell edge. The difference between a logical 1 and a logical 0 lies entirely in the width of the portion of the cell that the voltage is above 0. This width is stated as a fraction of the total cell width or as the ratio of time that the signal is at top amplitude to the time that the signal is zero. In other words, there is no need for an absolute measurement of time, to determine the value of the bit, that is, whether it is a 1 or a 0. It is the ratio of the time that the signal is at top amplitude to the time duration of the cell.

Next, refer to line (e), which is the indication of a sync cell and data logical 1 combination. Here, at the first cell edge, the voltage rises along line 100 and remains at 1, as shown by line 127 for a time corresponding to the duration of the portion 102 of the data cell containing a logical 1. The voltage then drops back to zero along line 106 and remains zero along line 104 for the rest of the time of two normal cell widths. (The vertical dashed lines 121A, 121B, 121C, represent the boundaries between adjacent cells.) Since there is no cell edge at the intermediate dashed line 121B, the wave shape on line (e) indicates that the cell width, that is from cell edge 100 to the following cell edge 100, is longer than the normal cell and is, in fact, equal to the width of two normal cells. However, the data value of the cell is indicated as before in the relative width of the portion 127.

Referring now to line (g), there is shown a sync cell and data combination for a logical 0. As in all cells, there is a vertical line 100, being the cell edge at the beginning of the cell. The portion of positive voltage 128, now extends into the second half of the sync cell, dropping down along line 106', to 0 along the line 104 until the next cell edge is reached.

These represent the four types of voltage wave shapes within the cells which are to be detected and decoded by the apparatus.

As stated briefly before, the data detector comprises an updown counter that reads up whenever the cell voltage is positive and reads down when the cell voltage is negative. The counter of the data detector is shown is line (b), where the count, represented by the amplitude of line 108, increases as time increases to the right, until the edge 106 of the cell voltage is reached, and then the downcounter begins to counter and the counter of the counter then falls to 0, and becomes negative along the line 110 until the next cell edge is reached at point 112. This remaining negative voltage at the end of the cell, in accordance with arrow 114, represents a logical 1.

In line (d), the same sort of diagram is indicated for the logical 0 bit cell of line (c). This has the increasing count line 108' countinuing until the end of the positive voltage 106' of the 0 bit cell. Then the downcounter begins to operate along the line 110', reaching a remaining count 112', represented by the arrow 114', which indicates by its positive count, a logical 0 value for the bit.

The same type of operation is found for the sync cell as indicated on line (f). Here, a combination of sync cell and data logical 1 is shown, with a short rising count 108, and a very long downcount represented by the line 122, to a remaining value at 124, showing a large negative count by arrow 126. So long as the total count of the cell is negative, it indicates a logical 1, even through the magnitude of the count is different from that on line (b). (A second portion of the apparatus will evaluate the magnitude of the resultant count to determine whether a cell is a normal cell, as indicated by lines (b) and (d), or a sync cell, as indicated by lines (f) and (h).)

Line (h) shows the diagram corresponding to line (f), for a logical 0 in combination with a sync cell. Because of the great width of the line 128 of line (g), the upcount 136 is of long duration and the downcount 138 is of short duration, The total or net count at the end of the cell indicated by numeral 140 and arrow 142 is a large positive count, i.e., a logical 0.

Figure 3:
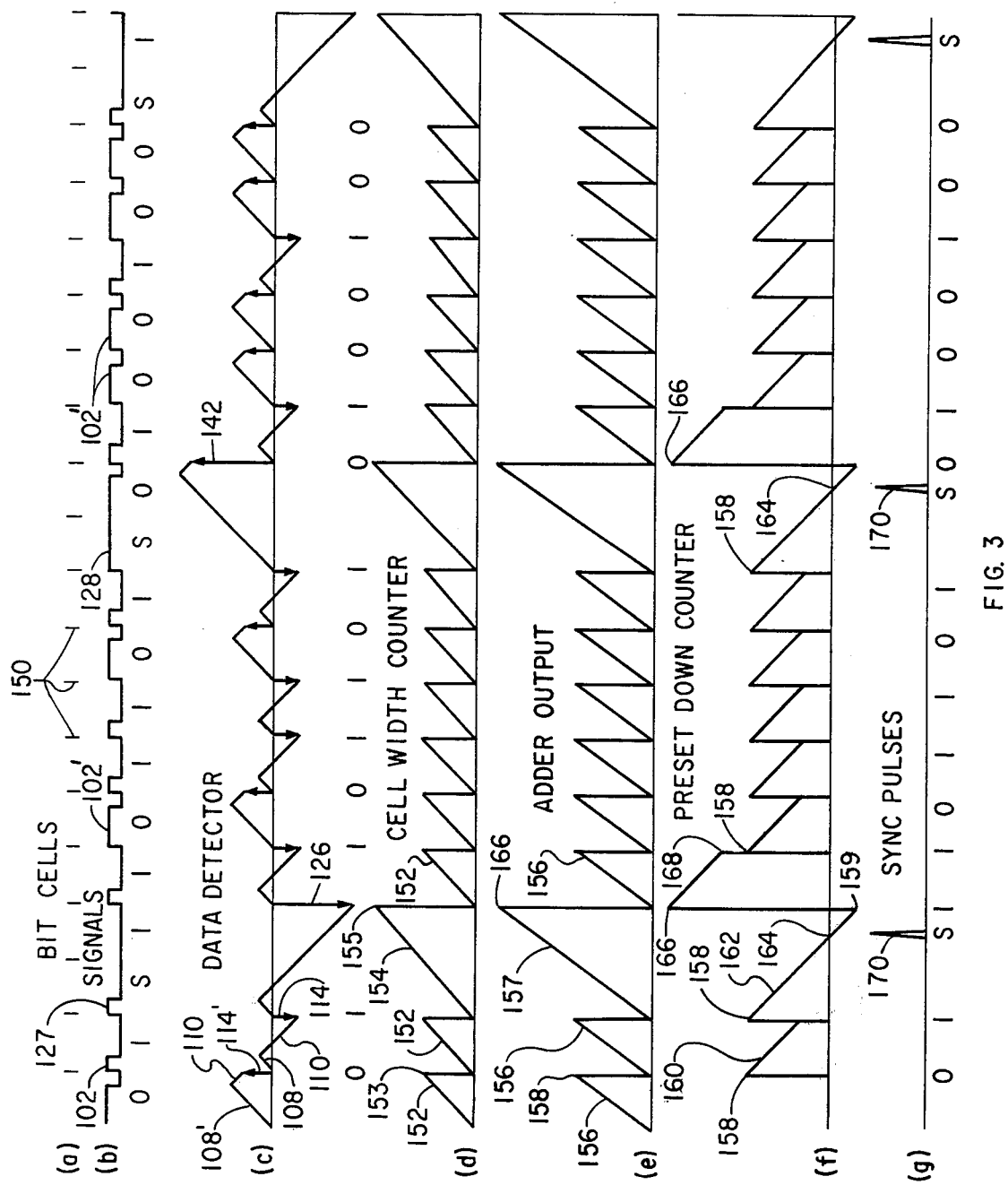
FIG. 3 represents additional wave shapes at various points in the apparatus for the purpose of clarifying the operation of the apparatus.

Referring now to FIG. 3, there is shown a group of traces indicating the voltage or count at various parts of the apparatus shown in FIG. 1. Line (a) shows a series of short vertical lines which indicate cell boundaries, or the edges of the bit cells, indicated by numeral 150. In line (b) is shown a countinuing signal made up of successive bits of logical 0's or logical 1's, each of which separately conforms to the shape of lines (a), (c), (e), or (g) of FIG. 2. That is, they are either 0's or 1's and can be sync cells or normal cells. For example, the first 1 cell shows a short period of positive voltage 102. In the sync cell and logical 1 that follows, the period of positive voltage 127 is again short and the 0 value is long and continues to the end of the second cell width.

Later, the 0 cells 102' are shown and the sync cell with a long duration of positive voltage, all as previously indicated in FIG. 2.

Trace (c) shows the output of the data detector responsive to the signals of part (b). This is made up of 5 segments corresponding to lines (b), (d), (f), and (h) of FIG. 2, and are self-explanatory. Line (d) of FIG. 3 is the output of the cell-width counter and shows sloping lines 152, which indicate the increasing count, with time, of a normal cell. At the end of the cell the counter is reset, to start again at 0, to follow a second line 152 to the end of the cell and then again drop to 0. The next cell is a sync cell and the counting goes on for a time interval equal to two cell-widths according to line 154 to a terminal value 155. At the end of the cell, it drops to 0 and the same process of counting goes on again in succeeding cells. Line (e) represents the output of the adder. This is similar to that of line (d) of this FIG. 3, except that it rises to a value 1.5 times that of line (d) at each of the boundaries of the cells. That is, line 156 rises at a more rapid rate, and reaches a peak value 158, which is 1.5 times the peak 153 of line (d). Correspondingly, the line 157 rises 1.5 times as rapidly as the line 154 and reaches a peak 166, which is 1.5 times the value of the peak 155.

When the output of the preset downcounter, indicated by line (f), takes the output of line (e), that is, the output count of the adder, and counts down, it starts at a value of 153 (which is the output of the adder on the previous cell) and drops down along the line 160, the slope of which is the same as the slope of the lines 152, since both counters are being supplied by the same oscillator or clock. Consequently, in a normal cell, the downcount never reaches 0 because the input into the counter is more than the output of the cell-width counter. The action for the sync cell is different because of its double width. Starting with the downcount at point 158 along the line 162, the downcounter counts to a point 159 which is negative. When the count reaches 0, the preset downcounter puts out a pulse, which serves to operate the buffer storage, stating to it, in effect, "This is almost the end of the sync cell, so load the buffer storage and be prepared to load the shift register with the bit value of the sync cell at the next cell edge." This is represented by the negative voltage 126 of line (c). Consequently, as shown in line (g), a pulse 170, called the sync pulse, is supplied by the preset downcounter and serves to load buffer storage.

With these comments on the type of recording and the wave shapes, etc., it will now be more easily understood to go back to FIG. 1 and describe in detail the operation of the system.

Referring now to FIG. 1, the dashed outline indicated by numeral 10 and identified as the data detector, comprises an oscillator, or clock, 20, the output of which goes by lead 25 to an AND gate 22, the output of which goes to the UP input to the up-down counter 28. It also goes by leads 52 and 35 to a second AND gate 24 and through lead 29 to the DOWN input of the counter 28.

The two gates 22 and 24 are enabled by a single on line 32, which is the input to the apparatus from the playback head of the magnetic tape. The incoming signal on line 32 is indicated generally by the numeral 240 as being a series of pulses of various pulse widths, which represent the data in the various cells recorded along the tape. This signal corresponds to line (b) of FIG. 3, and is used to enable either gate 22 or gate 24. This is done by taking the signal on line 34 to the line 26 and gate 22, so that when the portion of the signal is positive (like line 102 of line (a) of FIG. 2), then gate 22 will be enabled and the counts from the oscillator go into the UP counter 28 and cause it to count in a positive direction. When the portion of the signal 240 is 0 (like line 104 of line (a) of FIG. 2), then the signal on line 34 goes through an inverter 38, which, through line 36 enables the gate 24, and the count of the oscillator 20 on lead 35 now is communicated by lead 29 to the down portion of the counter 28, and it begins to count down from the value that it gained due to the prior counts coming through the gate 22.

The cell detector 40 is also connected to the line 32 and, as previously explained, detects the leading edge (or cell edge) of each cell. Referring momentarily to FIG. 2, there is shown in line (i) a very short time-duration pulse 132, 134 which rises sharply on the beginning of the cell, or the cell edge, along line 132, and then rapidly drops along line 134 back to 0, and stays 0 until the edge of the next cell. The rising portion 132 of the output of cell detector 40 goes by lead 31 to reset the counter 28. The oscillator 20 output is continually going to the counter, either through gate 22 or gate 24, that is, to the up or the down portions of the counter, and, at each cell edge, the counter is reset to 0.

The output of the counter 28 goes by lead 30 to the shift register 16. This output, converted to a 1 or a 0, depending on the sign of the count, is continually impressed on the line 30 going to the shift register. In other words, the first cell of the shift register is connected to the output of the counter by line 30. When the count is negative, a 1 is loaded into the first cell of the register, and, when the count is positive, a 0 is loaded into the register. The time of loading is provided by the signal from the cell detector along line 41 to the strobe input of the shift register. Therefore, it is seen that the up-down counter 28 functions as the data detector and its output in the form of a sign signal on line 30 is the means for entering data into the shift register. Each successive bit is appropriately stored (timed by the cell detector which is sensitive to the cell edge of the incoming data) in register 16.

IN FIG. 1, the numeral 12 indicates generally, by the dashed outline, a portion of the sync-cell detector part of the apparatus. It comprises the cell-width counter and added portions. A standard counter 56 is provided with input on lead 53 from the oscillator 20. This counter is reset at each cell edge by the cell detector 40, which puts out a pulse on line 42 connected to the reset input 58 of the counter 56.

A plurality of output leads 60A, 60B . . . 60N have potentials on them at any time representative of the instantaneous count of the counter 56. Each lead represents one bit of the digital word representing the count. Leads 60 go to an adder 66, which has two sets of inputs, the X inputs which receive input from the counter 56, and Y inputs which receive signals from the leads 60A, 60B, etc., through the leads 64A, 64B . . . 64N. The lead 60A represents the most significant bit in the input to the X part of the adder, and leads 64A connects lead 60A to the Y portion of the adder, i.e., line 62B. In other words, the most significant bit of the X input goes to the next most significant bit of the Y input, and similarly for the other leads 64B . . . 64N, they also go to corresponding leads on the Y input, but of one-bit lower value.

The digital word on the leads 60, is of twice the value of the digital word on leads 62, since, by shifting the word bits by one bit, the number is divided by two. Thus, the output of the adder 66, shown on leads 68, is a continuously updated number, which is 1.5 times the digital number on the leads 60.

The output leads 68 go to a downcounter 70, which is in the dashed outline 14, which represents the preset down counter. This counter 70 has an input on lead 54 from the oscillator 20. It has inputs on leads 68 which represent a digital word which is 1.5 times the output of the counter 56, during the preceding cell. In other words, the output of counter 56 at the end of the cell, just before it is reset, is multiplied by 1.5 in the adder 66, and is injected as a preset into the counter 70, at the beginning of the succeeding cell. The preset lead 72 of counter 70 gets a signal from the cell detector 40, so that while the counter 56 is being reset to 0, the counter 70 is being reset to 1.5 times the previous cell ouput of the counter 56. Both counters 56 and 70 receive the same oscillator impulses on leads 53 and 54, respectively, so that it is clear that the counter 70 will never count to 0 in the same time that the counter 56 counts up from 0, because of the effect of the adder.

However, when a situation arises, as shown in FIG. 3, line (f) (this line representing the condition in the present downcounter 70), it is seen that for a normal bit cell where the count output of the adder is 158 for the preceding cell and the count is reduced according to the line 160 during the succeeding cell, the count never gets to 0, but reaches approximately 2/3 of the way down to 0. Again, on the next cell edge, the input goes back up to 158 which represents 1.5 times the count of the preceding cell. However, during occurrence of a sync cell, where the width of the cell is approximately twice the width of the bit cell, the downcounter 70 continues along line 162 down to a 0 value at a time 164. When the counter 70 reaches 0, a pulse is sent from the output 74, by lead 46 to the buffer register 18. This signal then causes the buffer register to transfer, in parallel, the signals on leads 44A, 44B . . . 44N (which represents each of the serial bits stored in the shift register) to the buffer register 18, where they are stored until called for by the computer. The computer (not shown) places a signal on the shift-out lead 50, equal to a statement "Shift out to the computer." The data stored in the register 18 then goes out in parallel on a plurality of leads, in accordance with the manner in which the computer is connected to the buffer register 18.

Referring back to FIG. 2, line (f), attention is called to the shaded area 128 which represents the time when the voltage 162 (FIG. 3) passes through 0, at point 164, in line (f), This occurs at some point in a zone 128, because of variations in motor speed in the recording and playback operations. When the count of the downcounter 70 reaches 0, the signal is sent to the buffer register 18 to load the data from shift register 16 into the buffer register, and, then, on the next cell edge, to start loading the shift register with the bit represented in the sync cell. Since the load signal is given prior to the end of the sync cell, normally in approximately two-thirds to three/fourths the way through the sync cell, there is adequate time for the data to be loaded and, at the end of the sync cell, to determine the bit value and to shift it into the shift register. The succeeding bits then are shifted into the shift register until the next sync cell is received, at which time they are all transferred out. The first bit in the word that is shifted out will always be the bit value of the sync cell.

Referring back to FIG. 3, it is seen that at the time 164, when the preset downcounter reaches 0, the sync pulse 170 is transferred out of the counter on lead 46 to the buffer register.

It is clear that the apparatus indicated in FIG. 1 and described above clearly meets the objective of this invention. The input signal is on lead 32, represented by the wave shapes 40 (and, as shown in considerably more detail, the wave shape on line (b) of FIG. 3). The data content of each cell of the input signal is detected in the dashed outline indicated by numeral 10, and in particular in the up-down counter 28. The signal on lead 30 is the data content of the signal on lead 32. The cell-width counter 56, the adder 66, and the preset downcounter 70, together, combine to form a detector of the sync cells, based on the fact that the sync cell is of double-cell width. However, the sync cell has bit content like any other cell, and the output of the preset downcounter is a sync pulse, which causes the buffer register to load in the previous word, and to start a new word, the first bit of which is that involving the sync cell.

The components illustrates as boxes in the apparatus of FIG. 1, such as the oscillator, the up-down counter, the AND gates, shift register, buffer register, cell detector, adder, and downcounter, are all commercial pieces of digital logic that can be purchased off the shelf, which are well known, and described in textbooks, so that further description of these elements of the circuit is not required.

It is apparent from the above description that simple and widely available digital units, such as the AND gate, counter, shift register, etc., have been combined into an arrangement which is inherently stable; which is simple and positive in operation; and, primarily, which is independent of the recording and reproducing speeds of the tape (or other recording/reproducing apparatus employed) within wide limits. The data detector relies only on the comparison of the time within each cell at which the reproduced signal changes from a 1 to 0 (or vice versa), to the total cell time; while the tape speed for record or reproduce may change, the comparison usually does not so change. The same is true for determination of the sync cell. The speed at which the signal is decoded is not of prime interest either, since a computer-actuated buffer register is employed.

While the invention has been described with a certain degree of particularity, it is manifest that many changes may be made in the details of construction and the arrangement of components. It is understood that the invention is not to be limited to the specific language used nor the specific embodiments set forth herein by way of exemplifying the invention, but the invention is to be limited only by the scope of the attached claim or claims, including the full range of equivalency to which element or step thereof is entitled.

We claim:

1. A pulse-width signal-decoding system into which a signal passes, said signal comprising a plurality of adjacent cells, each defined at the ends by a rapid transition of a signal amplitude in a first direction and at some intermediate point by a rapid transition of the signal amplitude in a second and opposite direction, comprising:

a. data-detecting means for examining each cell to produce a logical 1 or a logical 0, depending only on whether said intermediate point occurs in one or the other half width between said ends of each cell;
b. sync-cell detector means for examining each cell to detect the presence of a sync cell (defined as being of at least approximately double normal cell width) and producing an unloading pulse therefrom;
c. shift register means coupled to said data-detecting means for temporary separate adjacent storage of the adjacent data bits comprising said logical 1s and said logical 0s detected by said data-detecting means;
d. a buffer register coupled to said shift register; and
e. means responsive to said unloading pulse from said sync-cell detector, at the occurrence of a sync cell, to load said shift register into said buffer register:
wherein said data-detecting means comprises:
a. up-down counter means having an up input, a down input, an output indicating the sign of the count, and a reset terminal;
b. an oscillator;
c. a signal input line;
d. a first AND gate with output connected to said up input, one input connected to said oscillator, and the second input connected to said signal input line;
e. a second AND gate and an inverter, said second AND gate with output connected to said down input, one input connected to said oscillator, and the second input connected through said inverter to said signal input line;
f. said output of said up-down counter connected to said shift register means; and
g. cell-detector means connected to said input signal line for producing a cell edge signal at the start of each cell, the output of said cell detector being connected to said reset terminal of said up-down counter and to a shift input of said shift register:
and wherein said sync-cell detector means comprises:
a. a cell-width counter having an input terminal connected to said oscillator, a reset terminal connected to said cell detector means, and a plurality of output leads for representing the count as a multibit binary number;
b. a binary adder means having a first plurality of input terminals, a second plurality of input terminals, and a plurality of output terminals, said first input terminals connected systematically to the corresponding output of said cell-width counter, said second inputs being systematically connected to said first inputs at terminals, each one less than the corresponding said first plurality of terminals, in a way to represent a binary number of one-half the value of the number on said first input terminals, whereby the signal on said output terminals represents 1.5 times that on said output leads of said cell-width counter;
c. a preset downcounter having a plurality of input leads, connected systematically to the corresponding said plurality of output leads of said adder means and a down count input connected to said oscillator;
d. means connected to said downcounter and to the cell detector means to preset it to the number represented by said adder output at the occurrence of a cell edge signal; and
e. output means connected to said downcounter to indicate when its said count is 0, said count of 0 being an indication of detection of a sync cell.

* * * * *

UNITED STATES PATENT OFFICE
CERTIFICATE OF CORRECTION

Patent No. 4,032,915   Dated June 28, 1977

Inventor(s) John L. Shanks et al.

It is certified that error appears in the above-identified patent and that said Letters Patent are hereby corrected as shown below:

Column 1, line 28, "work" should read --word--.
          line 29, "a" should read --of--.
          line 35, "works" should read --words--.
Column 2, line 33, "same" should read --time--.
          line 33, "call" should read --cell--.
          line 36, "counter" should read --count--.
          line 39, "mutliple" should read --multiple--.
          line 47, "counter" should read --count--.
Column 3, line 29, "rinse" should read --rise--.
          line 41, "two-third" should read --two-thirds--.
          line 42, "three-fourth" should read --three-fourths--.
Column 4, line 17, "counter" should read --count--.
          line 21, "counter" should read --count--.
          line 22, "counter" (first occurrence) should read --count--.
          line 29, "countinuing" should read --continuing--.
          line 60, "countinuing" should read --continuing--.
Column 5, line 1, after "cell" and before "with" insert --128--.
          line 29, "153" should read --158--.
          line 61, "single" should read --signal--.

UNITED STATES PATENT OFFICE
CERTIFICATE OF CORRECTION

Patent No. 4,032,915          Dated June 28, 1977

Inventor(s) John L. Shanks et al.

It is certified that error appears in the above-identified patent and that said Letters Patent are hereby corrected as shown below:

Column 6, line 62, "leads" should read --lead-- .
Column 7, line 20, "ouput" should read --output-- .
          line 27, "sent" should read --set-- .
Column 8, line 25, "illustrates" should read --illustrated-- .

Signed and Sealed this

Twenty-seventh Day of September 1977

[SEAL]

Attest:

RUTH C. MASON
*Attesting Officer*

LUTRELLE F. PARKER
*Acting Commissioner of Patents and Trademarks*